No. 863,348. PATENTED AUG. 13, 1907.
M. BIRKIGT.
CONSTRUCTION OF AUTOMOBILE VEHICLES.
APPLICATION FILED JUNE 23, 1905.

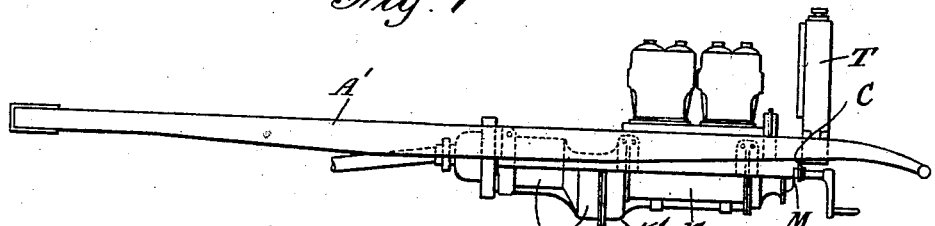
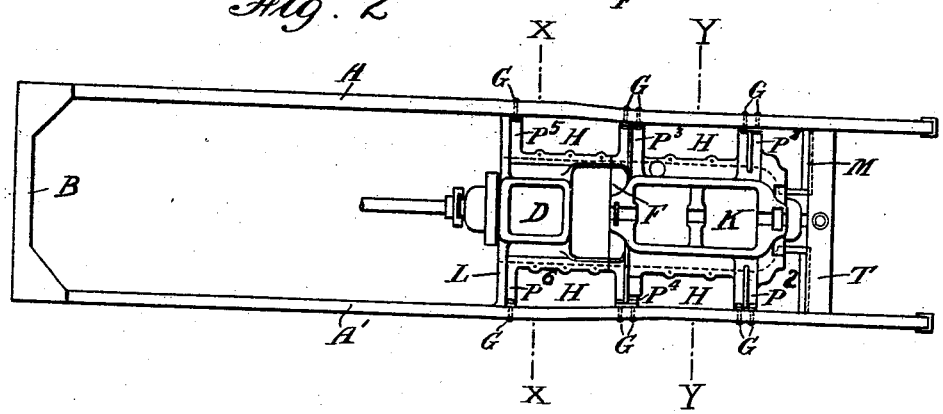
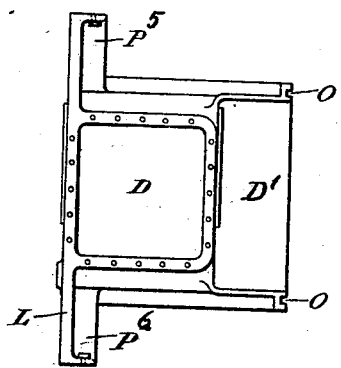
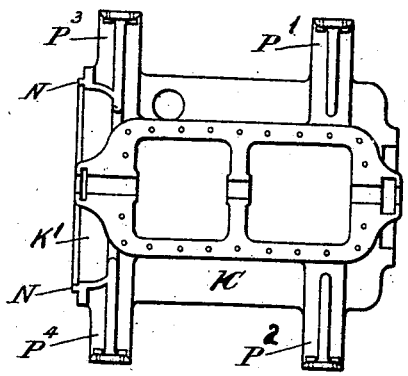

2 SHEETS—SHEET 2.

Witnesses:
A. J. Haddan
S. Ford

Inventor
M. Birkigt
By his Attorney
R. H. Madden

UNITED STATES PATENT OFFICE.

MARCOS BIRKIGT, OF BARCELONA, SPAIN.

CONSTRUCTION OF AUTOMOBILE VEHICLES.

No. 863,348.      Specification of Letters Patent.      Patented Aug. 13, 1907.

Application filed June 23, 1905. Serial No. 266,647.

*To all whom it may concern:*

Be it known that I, MARCOS BIRKIGT, a subject of the King of Spain, and a resident of Barcelona, in Spain, have invented certain new and useful Improvements in the Construction of Automobile Vehicles, of which the following is a specification.

The present invention relates to improvements in the construction of automobile road vehicles for the purpose of supporting the motor and gear box so that their shafts are maintained in true alinement and for obtaining an inclosed or sheathed automobile vehicle frame, which is without apertures or seams at its outer edge.

The improvements are represented in the annexed drawings in which

Figure 3:
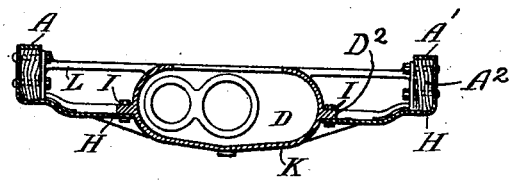
Figure 4:
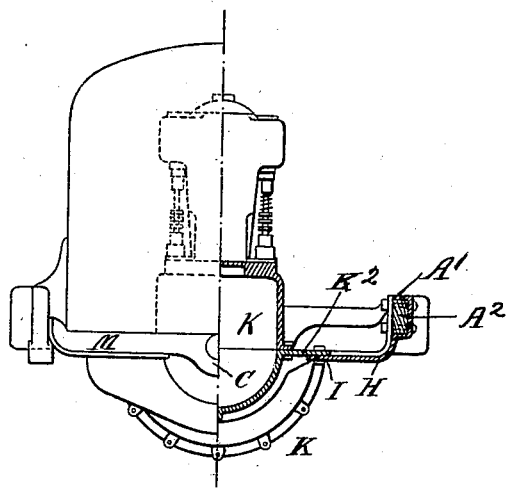
Figure 7:
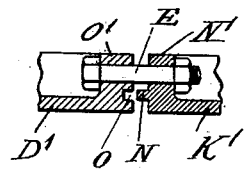

Figure 1 is an elevation and Fig. 2 a plan view of the frame. Fig. 3 is a cross-section on line $x$—$x$. Fig. 4 shows on the left a front view of the frame, and on the right a section on line Y Y. Figs. 5 and 6 are plans of the lower halves of the gear box and engine crank casing respectively. Fig. 7 is a detail view in section on a larger scale showing the connection of the lower halves of the gear box and crank casing to one another.

The frame consists of two side members A and $A^1$ of channel steel which may be reinforced with wood as illustrated at $A^2$ Figs. 3 and 4. These side members are connected rigidly together at the rear by a cross bar B of the same material and near the front by a cast crosspiece C. The lower flanges of the channel steel side members are extended and bent downwards as at H towards the lower parts of the motor crank case K and of the gear box D so as to close the space between these and the frame.

For the proper action of the mechanism it is essential that the motor crank shaft and the change speed shaft should be adjusted and maintained in alinement. The lower half of the motor crank case and the corresponding part of the gear box are formed so that they can be bolted together, each having an extension $K^1$ or $D^1$ respectively to meet each other and define the space in which the clutch is intended to be placed between the motor and the gear box. In forming the contact surfaces of the two extensions $K^1$ and $D^1$, a circular groove O (Fig. 4) concentric with the shafts is formed in one of the said surfaces to exactly correspond with a corresponding circular rib or projection N on the other contact surface. The flanges $O^1$ $N^1$ are bolted together by bolts E.

The connected motor crank case K and gear box D are supported by six brackets, four of which $P^1$ $P^2$ $P^3$ $P^4$ are on the motor crank case and two others $P^5$ $P^6$ on the gear box. These brackets extend to and are bolted directly to the side members A $A^1$ of the frame by bolts G. The spaces between said brackets are hermetically closed by the sheet metal portions H H of the frame before referred to, which extend to and are fastened by bolts I to flanges $K^2$ on the crank case and $D^2$ on the gear box, and M on the transverse member C.

I claim as my invention:

1. In an automobile vehicle the combination of a frame comprising flanged metal side members, a motor crank casing and a gear box, portions integral with the flanges of said side members extended to and bolted to said crank casing and gear box respectively, and brackets extending to and carried directly by said side members and supporting the weight of said casing and gear box irrespective of the said portions of the side members, substantially as described.

2. In an automobile vehicle, the combination of motor crank case and gear box having extended meeting portions, one of said portions having a groove concentric with the motor crank shaft and speed gear shaft, and the other a rib adapted to engage said groove, said portions adapted to be bolted together for the purpose described.

In witness whereof I have signed this specification in the presence of two witnesses.

M. BIRKIGT.

Witnesses:
     STAN. C. HARRIS,
     C. BONEBY DURDIN.